United States Patent [19]

Zimmerman

[11] Patent Number: 5,215,266
[45] Date of Patent: Jun. 1, 1993

[54] BALE SHREDDER

[76] Inventor: Irwin M. Zimmerman, Rte. 1, Rutledge, Mo. 63563

[21] Appl. No.: 839,410

[22] Filed: Feb. 20, 1992

[51] Int. Cl.$^5$ ............................................. B02C 18/14
[52] U.S. Cl. ................................ 241/101.7; 241/278.1
[58] Field of Search .................. 241/101.7, 278.1, 296, 241/297

[56] References Cited

U.S. PATENT DOCUMENTS

| Re. 17,315 | 6/1929 | Keith . | |
|---|---|---|---|
| 954,540 | 4/1910 | Prilliman . | |
| 1,759,905 | 5/1930 | Keith . | |
| 2,620,138 | 12/1952 | Vazieux et al. | 241/278.1 X |
| 2,685,900 | 8/1954 | Cross | 146/118 |
| 3,915,392 | 10/1975 | Kugler | 241/74 |
| 3,926,378 | 12/1975 | Ryan | 241/54 |
| 3,999,674 | 12/1976 | Meitl | 214/506 |
| 4,082,198 | 4/1978 | Anderson et al. | 214/519 |
| 4,094,427 | 6/1978 | White et al. | 214/505 |
| 4,151,961 | 5/1979 | Makofka et al. | 241/101 |
| 4,227,654 | 10/1980 | Seefeld et al. | 241/34 |
| 4,376,607 | 3/1983 | Gibson | 414/24.6 |
| 4,643,364 | 2/1987 | Lucas | 241/55 |
| 4,657,191 | 4/1987 | Dwyer et al. | 241/101 |
| 4,790,489 | 12/1988 | Paul | 241/101 |
| 4,830,292 | 5/1989 | Frey | 241/101 |
| 5,018,672 | 5/1991 | Peck et al. | 241/101.7 |
| 5,025,992 | 6/1991 | Niebur | 241/101 |

Primary Examiner—Douglas D. Watts
Attorney, Agent, or Firm—Grace J. Fishel

[57] ABSTRACT

A bale shredder tears a bale apart from the end and advances the bale longitudinally into the shredder. The shredder has a centrifugal fan with at least one rotor mounted thereon. There are knives on the fan and on the rotor and there is a loosely fitted collar of blades around the fan. As the bale is advanced into the fan, the knives on the rotor are wiped across the bale by the compound motion of the rotating fan and rotor and tears it apart. The knives on the fan cooperate with the blades in a scissoring action to shred the material torn loose by the rotor. The shredded material falls through the blades and is blown out the shredder by vanes on the centrifugal fan.

18 Claims, 4 Drawing Sheets

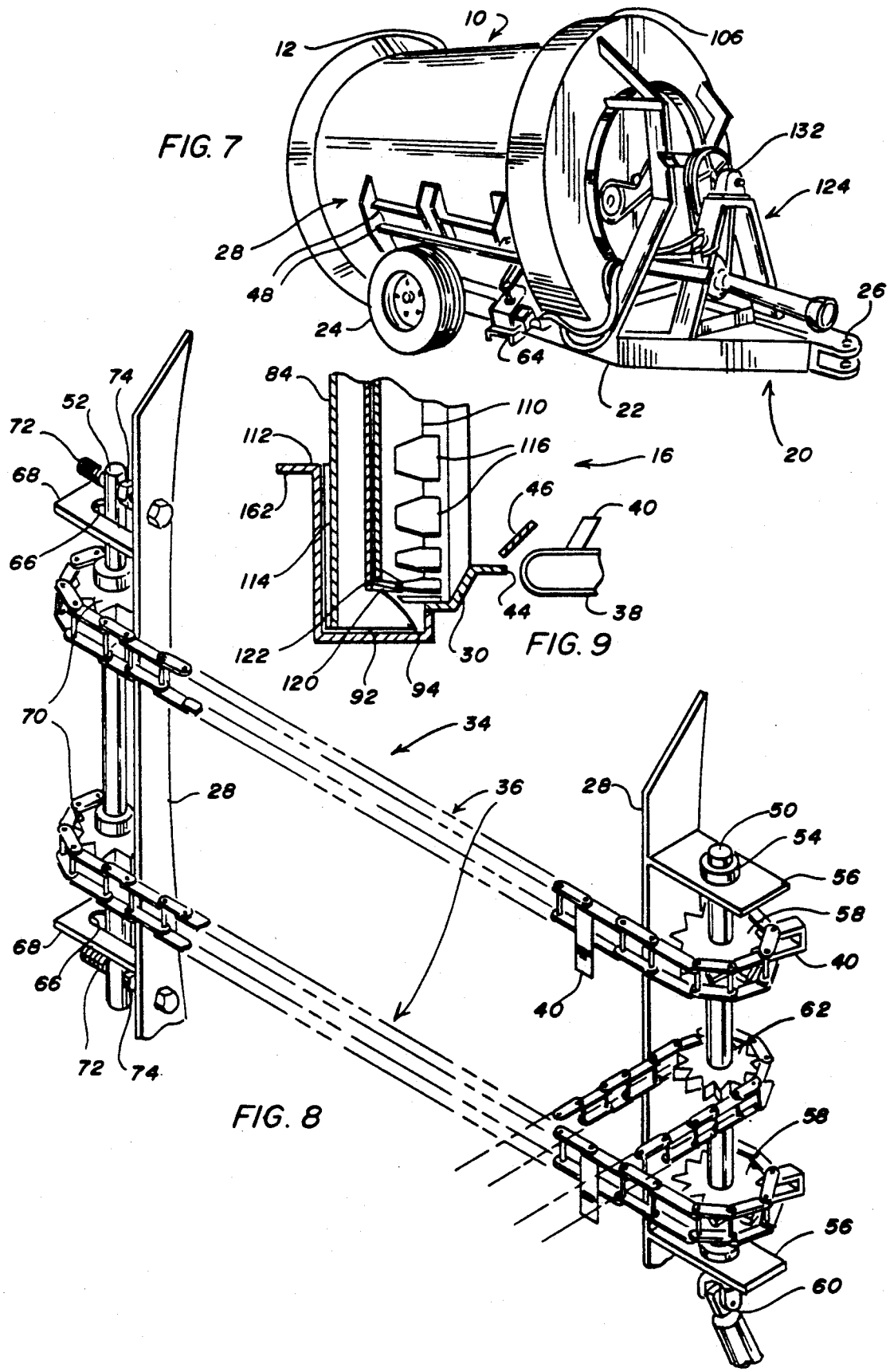

5,215,266

BALE SHREDDER

The present invention relates to a shredder which is intended for use in shredding bales of material, such as straw, hay or other forage. The shredder is particularly designed for use in shredding large round bales and distributing them as feed, bedding, mulch or the like.

BACKGROUND OF THE INVENTION

Straw, hay and other forage material are sometimes baled in large round bales measuring up to seven feet in diameter and weighing over two thousand pounds. Such bales have a number of advantages over smaller bales but they are very difficult to break up.

A number of different shredders have been proposed for tearing apart large round bales. Some of them have teeth which tear at the side of the bale where it is easier to break off material than from the closely packed ends. One example of such a machine is a Bale Buster sold by Vermeer Manufacturing of Pella, Iowa. A disadvantage with machines of this type is that the cutters must run the length of the bale. In addition, the Vermeer shredder is not designed to chop very finely. There are also shredders which tear apart large round bales from the end as exemplified by a Bale Chopper sold by Kidd Farm Machinery Ltd. of Wiltshire, England. In these machines, the bale is rotated over the cutters.

SUMMARY OF THE INVENTION

It is an important object of the present invention to provide a shredder which tears a bale apart from the end and which advances the bale longitudinally into the shredder. Other objects and features of the invention will be in part apparent and in part pointed out.

In accordance with the invention, a shredder for chopping bales of stray, hay and other forage has a bale receptacle with an inlet and an outlet. There is a means for advancing a bale towards the outlet. A centrifugal fan with a bale-side end is positioned substantially transverse the outlet of the bale receptacle. One or more rotors are mounted on the bale-side of the centrifugal fan. Each rotor has a axis of rotation substantially parallel to and offset from the axis of rotation of the fan. One or more knives are mounted on each rotor with the rotor knives projecting into the outlet for engaging and tearing apart the bale disposed within the outlet. A means is provided for rotating the fan and each rotor about its axis whereby the rotor knives are wiped across the bale in the outlet by the compound motion of the rotating fan and rotor and tear it apart.

Other features include a fan housing with a discharge opening and an aperture exposing the bale-side end of the fan. The outlet of the bale receptacle is abutted with the aperture in the fan housing. One or more knives are mounted on the bale-side about the periphery of the fan and a plurality of blades are mounted around the aperture in the fan housing. The blades project into the fan housing substantially parallel to the axis o rotation of the fan and loosely collar the knives on the fan. As the fan is rotated, the knives on the fan cooperate with the blades in a scissoring action to shred the material torn loose by the rotor.

Still other features include a plurality of vanes around the sides of the centrifugal fan for blowing the shredded material out the discharge opening for use as feed, bedding, mulch or the like.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings and in which:

FIG. 7 is a perspective right front view of the bale shredder.

FIG. 8 is a perspective front view of a moving means using chains as viewed from outside a bale receptacle; and, FIG. 9 is a enlarged detail taken along line 9—9 in FIG. 4.

DETAILED DESCRIPTION OF THE INVENTION

Figure 1:
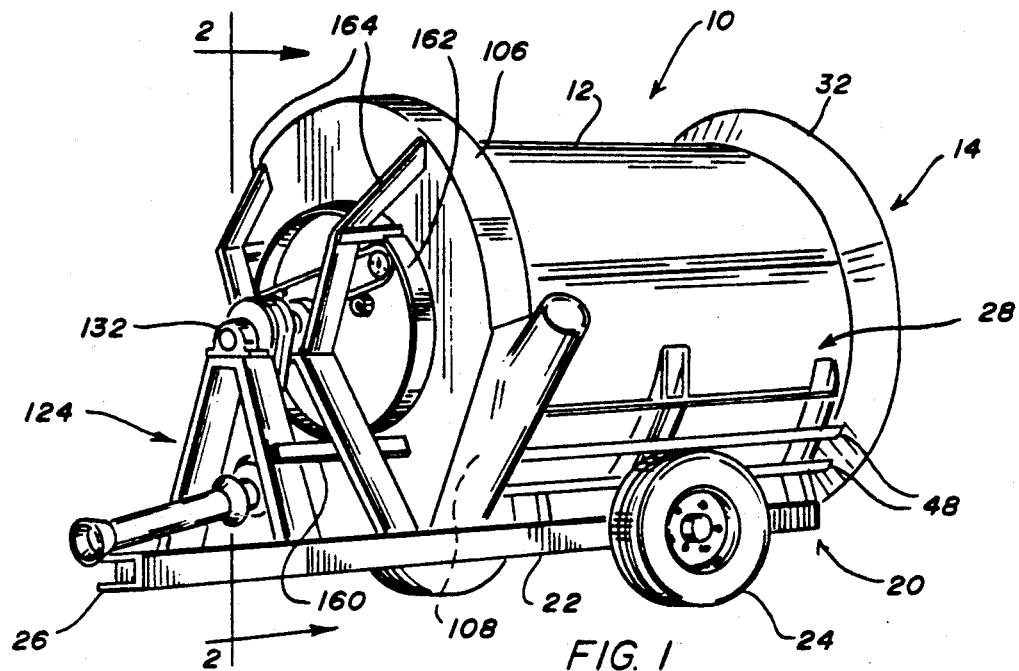
FIG. 1 is a perspective left front view of a bale shredder in accordance with the present invention.
Figure 2:
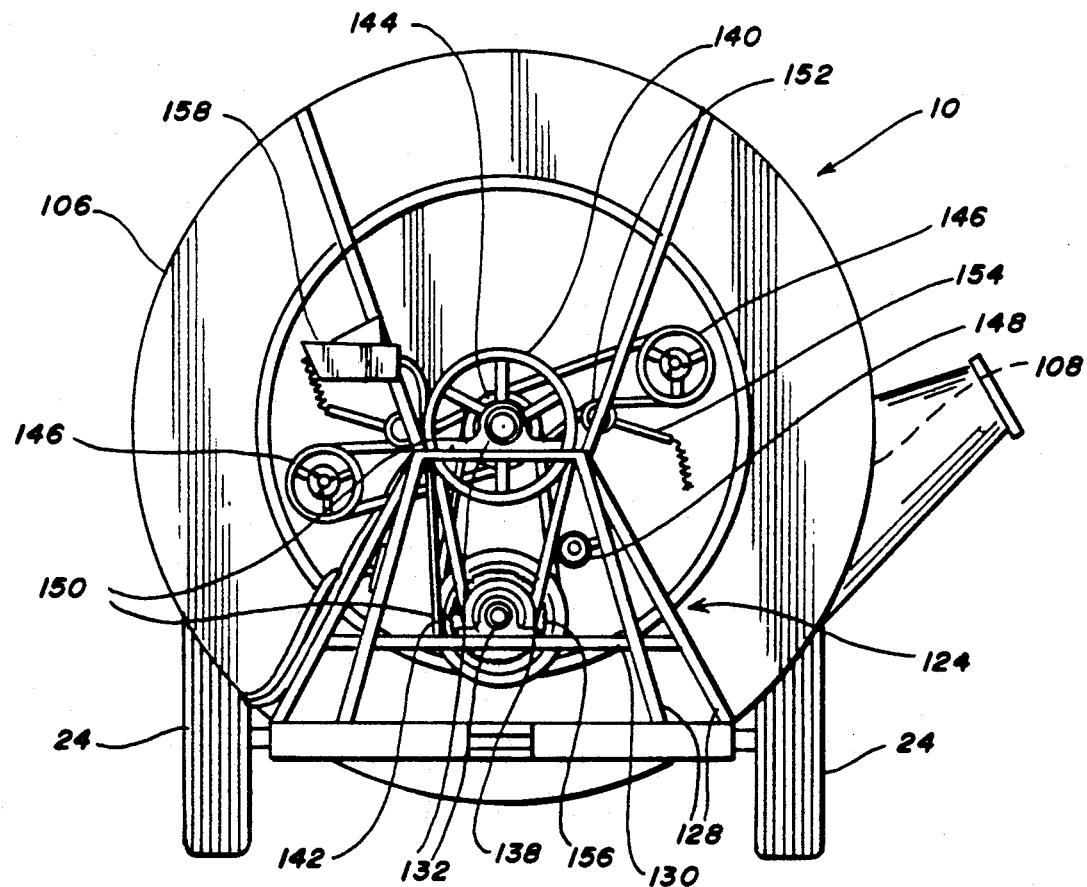
FIG. 2 is a front elevational view of the bale shredder.
Figure 3:
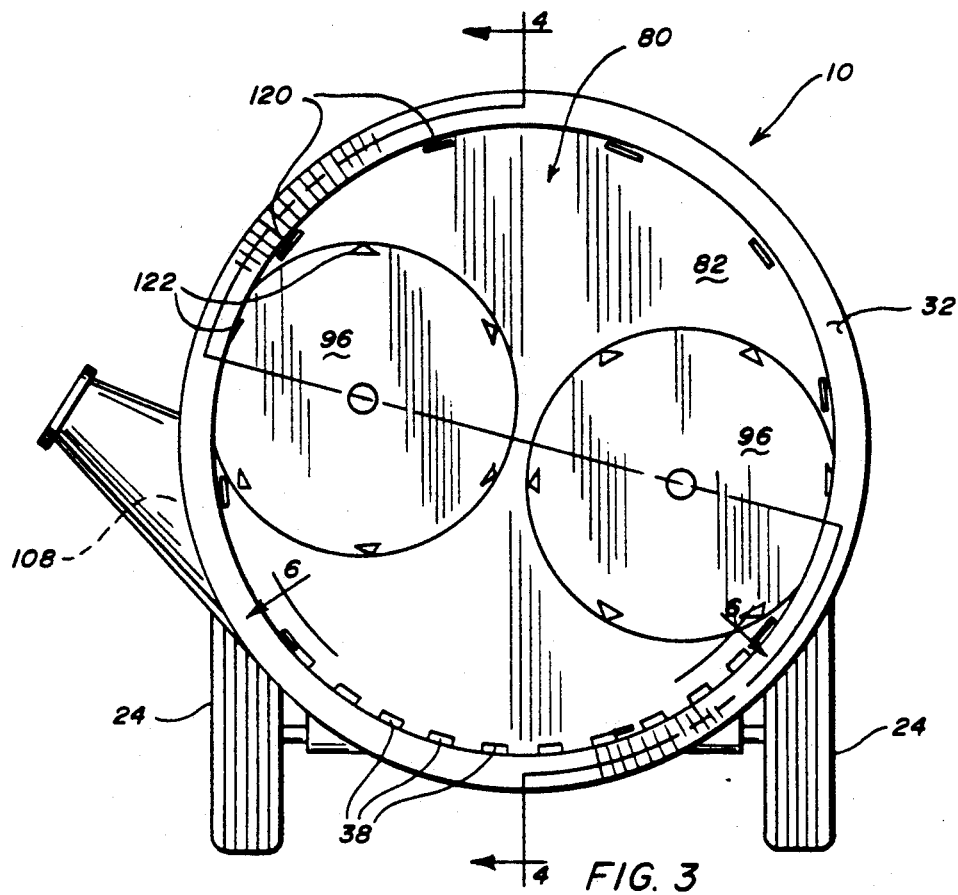
FIG. 3 is a rear elevational view of the bale shredder.

A bale shredder 10 in accordance with the present invention includes a bale receptacle 12 with an inlet 14 and an outlet 16. It is important that receptacle 12 be covered adjacent the outlet to confine a bale 18 while it is being shredded and it may be covered along its entire length. In the drawings, receptacle 12 is mounted on a trailer 20 including a base frame 22, ground engaging wheels 24 and a tongue 26 for attachment to a tractor (not shown). Receptacle 12 is supported in a cradle 28 formed by three arcuate pieces attached to base frame 22. While bale shredder 10 is shown mounted on a trailer, it can be self-propelled, pushed ahead of a powered vehicle, mounted on the bed of a truck and so forth. It can also be stationary.

The size of bale shredder 10 depends on the size of the bales to be shredded. To minimize power requirements, it is advantageous to make bale shredder 10 as small as possible. Several different models can be provided, e.g., one for bales seven feet across, six feet across, etc. When bale 18 is round, the bottom of receptacle 12 is preferably semicircular in cross-section. In the specific example shown in the drawings, receptacle 12 is a hollow cylindrical member with front and rear outwardly flared flanges 30 and 32, respectively. Rear outwardly flared flange 32 forms a funnel for guiding bale 18 into receptacle 12 and front outwardly flared flange 30 connects the outlet of receptacle 12 to a centrifugal fan described below. Front outwardly flared flange 30 also keeps material from kicking away from the centrifugal fan. If there is no front outwardly flared flange 30, a sectioned rubber curtain (not shown) can be used as a deflector.

Figure 6:
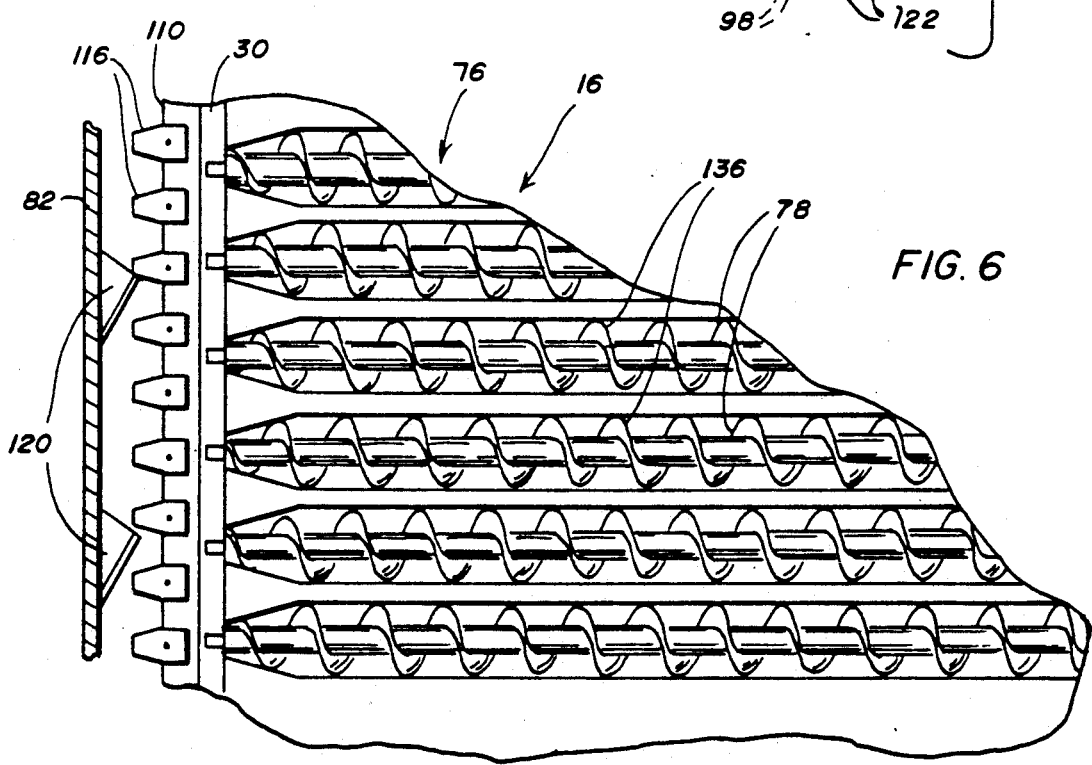
FIG. 6 is a detail taken in the direction of line 6—6 in FIG. 3 of a moving means using augurs.

A moving means 34 for advancing bale 18 towards outlet 16 is provided. Two of many possible embodiments are illustrated in the drawings. As shown in FIG. 6, moving means 34 is formed from a plurality of augurs 36. In the other drawings, it is formed from a plurality of chains 38. Turning first to FIGS. 1, 3-4 and 7-9, ten endless chains 38 act as a conveyor along the bottom and sidewalls of receptacle 12. As shown, chains 38 include transverse teeth 40 at spaced apart intervals. Transverse teeth 40 are angled towards inlet 14. Chains 38 run in chain guides 42 and pass through slots 44 in the bottom and sidewalls of receptacle 12 provided near inlet 14 and outlet 16. Slots 44 near outlet 16 have an upwardly directed flange 46 (shown in FIG. 9) at the forwardmost end of the slot for wiping the hay off teeth 40 as chains 38 exit the receptacle. Upwardly directed flange 46 and the rearward slope of teeth 40 keep the hay from being pulled out of the receptacle by the chain. Chain guards 48 are provided on the outside of receptacle 12 to protect the operator.

As best seen in FIG. 8, chains 38 are grouped in pairs on front shafts 50 and rear shafts 52 at the front and rear of cradle 28, respectively. Front and rear shafts 50, 52 are arranged end-to-end in strings which are curved around the outside of receptacle 12 and are centered about a longitudinal axis passing along the bottom of the receptacle. Chains 38 run up about one-third the circumference of receptacle 12 and may be positioned even further around the receptacle for better pulling action on the sides of the bale. The ends of front shafts 50 are received in shaft bearing blocks 54 in front brackets 56 attached to the front of cradle 28. Attached to each of front shafts 50 are a pair of sprockets 58 about which the drive end of chains 38 are wrapped. The ends of adjacent front shafts 50 extend through shaft bearing blocks 54 and are joined together with universal joints 60. A drive sprocket 62 is attached to one end of the string of front shafts 50. Drive sprocket 62 is connected to a hydraulic motor 64 which is mounted on base frame 22 near the front end of receptacle 12. Hydraulic motor 64 is powered off the hydraulic system of the tractor as more particularly described below.

With continuing reference to FIG. 8, the ends of each of rear shafts 52 extends through elongated slots 66 provided in a pair of rear brackets 68 attached to the rear of cradle 28. A pair of idler sprockets 70 are mounted on each of rear shafts 52 about which the driven end of chains 38 are wrapped. The ends of rear shafts 52 have a transverse hole and the tension on chains 38 is adjusted by moving rear shafts 52 forward and rearward on bolts 72 which pass through the holes. Nuts 74 hold rear shafts 52 in a selected position.

Turning now to FIG. 6, a second means 76 for advancing bale 18 towards outlet 16 is illustrated. In this case, a plurality of augurs 36 are provided along the bottom and sidewalls of receptacle 12. Augurs 36 are confined in augur guides 78 which prevent them from being lifted or laterally displaced from the bottom and sidewalls of receptacle 12. Like chains 38, augurs 36 can be driven off the hydraulic system of the tractor.

Figure 4:
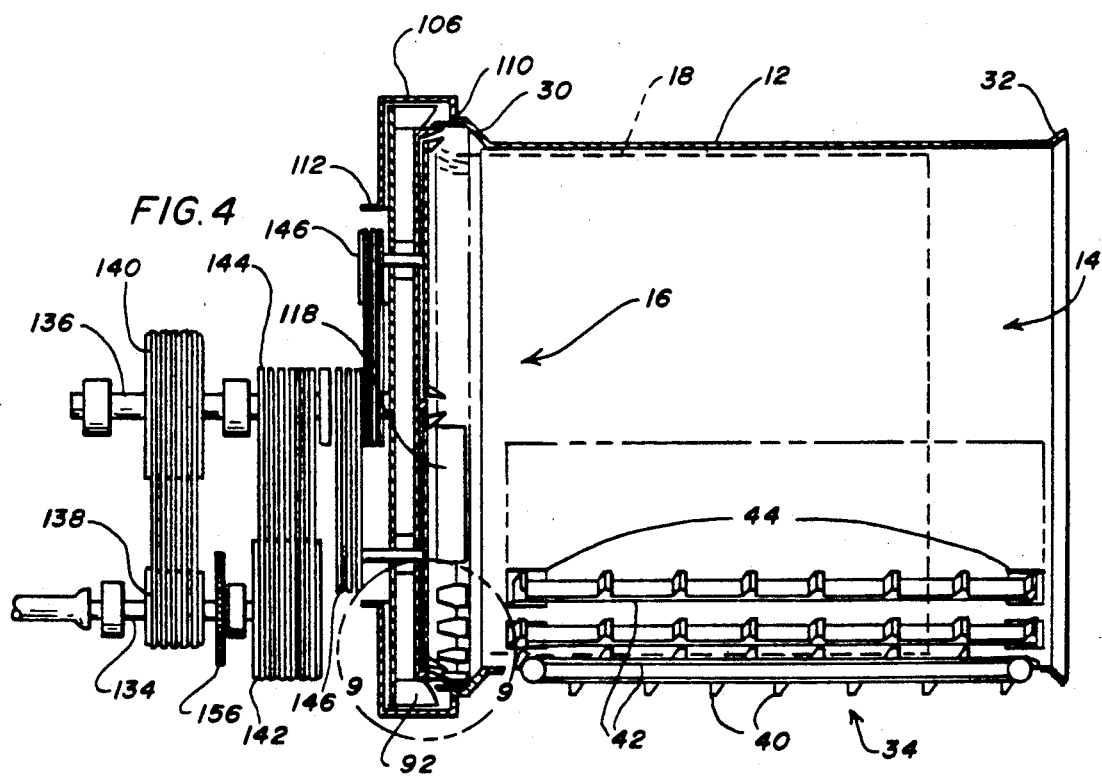
FIG. 4 is a sectional view taken along line 4—4 in FIG.
Figure 5:
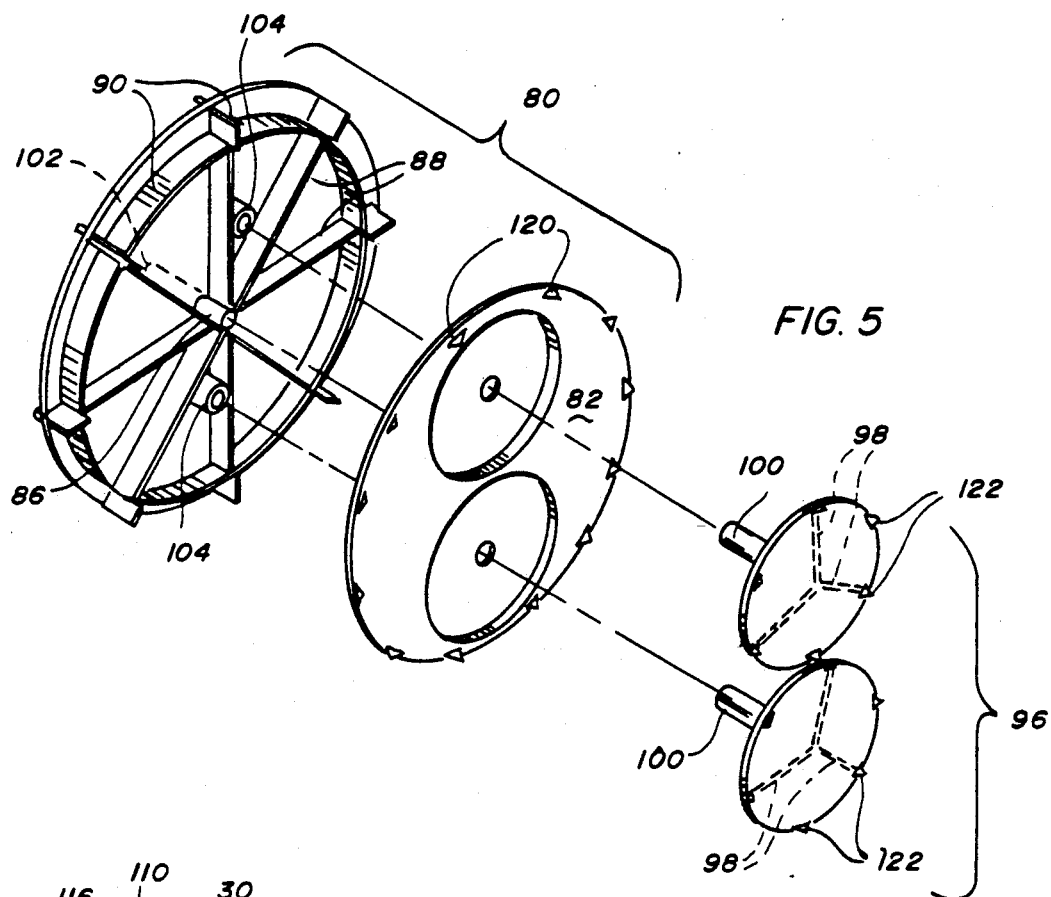
FIG. 5 is an exploded perspective view of a centrifugal fan and two rotors.

Centrifugal fan 80 as shown in FIG. 5 has a bale-side end 82 and an outside end 84 and is positioned with bale-side end 82 substantially transverse outlet 16. As shown in FIG. 5, centrifugal fan 80 includes a hub 86, spokes 88 and a rim 90. Outside end 84 and bale-side end 82 are attached to spokes 88 with outside end 84 having the same diameter as spokes 88 and bale-side end 82 having a slightly smaller diameter. Rim 90 is formed in segments and joins spokes 88 at the periphery of bale-side end 82. The ends of spokes 88 that extend beyond the periphery of bale-side end 82 form vanes 92. As best seen in FIGS. 4 and 9, vanes 92 have a toe 94 into which bale-side end 82 is notched and which extends beyond the face of bale-side end 82.

One or more spinners or rotors 96 are mounted on bale-side end 82 of centrifugal fan 80. Rotor or rotors 96 do not overlap each other and are preferably recessed in centrifugal fan 80 flush with the face of bale-side end. One or more radial bars 98 may be provided on the opposite side of each rotor to blow hay out of the recess. Each rotor 96 orbits within the periphery of the fan and has an axis of rotation substantially parallel to but offset from the axis of rotation of the fan. Each rotor 96 is mounted on a rotor shaft 100 and centrifugal fan 80 is mounted on a fan shaft 102. The rotor shafts preferably turn in the same direction as the fan shaft. For better balance, rotors 96 are provided in matched pairs on centrifugal fan 80 and are mounted in rotor bearing blocks 104 on opposite sides of a line passing through the fan's axis of rotation. It will be understood, however, that rotors 96 may be provided in other numbers and that they may be of different sizes.

Centrifugal fan 80 is enclosed in a fan housing 106 with a discharge opening 108. Discharge opening 108 may be adjustable in fan housing 106 so that the angle of discharge can be changed. Fan housing 106 has a bale-side aperture 110 exposing bale-side end 82 of the fan and an outside aperture 112 exposing outside end 84 of the fan. Fan housing 106 mates to front outwardly flared flange 30 of receptacle 12 around bale-side aperture 110. It is preferred that the connection between receptacle 12 and centrifugal fan 80 be flexible because receptacle 12 tends to flex as it is towed across a field on trailer 20. In the embodiment illustrated, this can be accomplished, for example, with a rubber sealed slip joint where front outwardly flared flange 30 joins bale-side aperture 110. Centrifugal fan 80 has an annular ring of radial bars 114 (preferably equal in number and positioned behind spokes 88) attached to outside end 84. Radial bars 114 extend from the rim of outside aperture 112 to the periphery of outside end 84. As centrifugal fan 80 is rotated in fan housing 106, radial bars 114 set up a back pressure which prevents significant amounts of chopped material from being blown out outside aperture 112.

A plurality of blades 116 are provided around bale-side aperture 110. Blades 116 project into fan housing 106 substantially parallel to the axis of rotation of the fan. Blades 116 form a loose collar around centrifugal fan 80. Blades 116 may be interrupted with a plate 118 which forms a shield over discharge opening 108. The purpose of plate 118 is to prevent hay from being drawn into discharge opening 108 at the cut-off point where vanes 92 pass the discharge opening and start back into the fan housing.

One or more knives (hereinafter fan knives 120) are mounted on centrifugal fan 80 and one or more knives (hereinafter rotor knives 122) are mounted on each rotor. Fan knives 120 and rotor knives 122 are preferably symmetrically mounted near the periphery of centrifugal fan 80 and rotors 96, respectively, to maximize the speed with which they slice into the hay. Fan knives 129 and rotor knives 122 are sharpened along their cutting edge (and may be hardened, particularly in the case of rotor knives 122) and are angled outwardly from their axis of rotation so that the hay is thrown outwardly in the direction of encircling blades 116 as it is torn loose from the bale. Rotor knives 122 project into outlet 16 and are wiped across the bale in the outlet by the compound motion of the rotating fan and the rotating rotor. Rotor knives 122 engage and tear apart bale 18 as it is advanced into the outlet by moving means 34. Fan knives 120 cooperate with blades 116 in a scissoring action to shred the material torn loose by rotor knives 122.

The fineness into which the hay is chopped is related to the spacing between the fan knives 120, rotor knives 122 and blades 116 and the distance between the fan knives 120 and the blades 116. For ease of maintenance, fan knives 120, rotor knives 122 and blades 116 can be bolted on so that spacing can be easily changed and so that they can be easily replaced. Chopping fineness is also dependent on the speed with which centrifugal fan 80 and rotors 96 are operated as more particularly described below. In the embodiment illustrated, the diameter of the centrifugal fan is 6 feet and the diameter of each rotor is 30 inches. Fan knives 120, rotor knives 122 and blades 116 are triangular and measure 3" at the base and 3" at the tip. Blades 116 are spaced 1½" apart and fan knives 120 and rotor knives 122 are distributed as shown in the drawings. It will be understood that these particulars are given as an example only and in no way limit the invention.

At the front of trailer 20, a pair of support frames 124 are attached to base frame 22. Each support frame 124 has a top 126 and pair of outwardly flared legs 128 connected with a cross bar 130. Pillow blocks 132 are mounted on top 126 and cross bar 130 of each frame and between which is journaled a drive shaft 134 and a driven shaft 136, respectively. Driven shaft 136 is connected to fan shaft 102.

A lower front drive pulley 138 is mounted on drive shaft 134. Lower front drive pulley 138 is connected to a larger upper front driven pulley 140 on driven shaft 136. Upper front driven pulley 140 turns the upper shaft which turns centrifugal fan 80. A lower rear drive pulley 142 is also driven by drive shaft 134. Lower rear drive pulley 142 is connected to a smaller upper rear driven pulley 144 which is journaled on driven shaft 136. Upper rear driven pulley 144 runs free on the upper shaft and turns rotor shafts 100. More particularly, rotor shafts 100 extend through outside end 84 of centrifugal fan 80. A rotor pulley 146 is attached to each rotor shaft 100 and is connected to upper rear driven pulley 144.

There is a spring loaded idler pulley 148 on the belts connecting lower rear drive pulley 142 and upper rear driven pulley 144. The tension on the belts connecting lower front drive pulley 138 and upper front driven pulley 140 is adjusted with shims 150 under pillow blocks 132 but a spring loaded idler pulley could be used for the same purpose. The belts on rotor pulleys 146 are tensioned by a spring loaded idler pulley 152 on a pivot shaft 154. The spring tension is adjusted s that the center of the idler pulley is above a radial line running though the pivot point of pivot shaft 154 such that as centrifugal fan 80 is rotated, centrifugal force tends to tighten the belt.

Drive shaft 134 can be powered by the power take-off from the tractor. When centrifugal fan is 6 feet in diameter, for example, torquing drive shaft 134 at 540 rpm is adequate to rotate pulleys 138, 140, 142 and 144 such that centrifugal fan 80 is rotated at 300 rpm and rotors 96 at 1000 rpm.

A saw-toothed wheel 156 is attached to drive shaft 134 between lower front drive pulley 138 and lower rear drive pulley 142. There is an electronic feedback mechanism 158 for controlling hydraulic motor 64. Electronic feedback mechanism 158 includes a sensor which reads the speed of drive shaft 134 from saw-toothed wheel 156. This information is then processed and used to control a flow valve that controls hydraulic flow to a forward and reverse valve. The forward and reverse valve controls the direction in which hydraulic motor 64 is operated such that the direction of travel of chains 38 can be reversed. When electronic feedback mechanism 158 senses that the speed of drive shaft 134 is slowing down because of the load on centrifugal fan 80, the flow valve slows or stops hydraulic motor 64. As centrifugal fan 80 picks up speed, the flow valve is opened and chains 38 are speeded up. For better sensing of the load on centrifugal fan 80, saw-toothed wheel 156 could be located on driven shaft 136. This arrangement would compensate for any belt slippage between lower front drive pulley 138 and upper front driven pulley 140. Augurs 36 can be powered in a comparable manner.

The bottom of fan housing 106 is supported by base frame 22. A pair of lower braces 160 interconnect front support frame 124 with a reinforcing flange 162 provided around outside aperture 112. A pair of upwardly extending arms 164 are connected to rear support frame 124. The ends of arms 164 are attached to the top of fan housing 106 and are interconnected midway their length to reinforcing flange 162.

In use, one end of bale 18 is placed in inlet 14 of bale receptacle 12. Moving means 34 are used to advance the bale towards outlet 16 such distance that the bale is balanced in receptacle 12, in which position bale shredder 10 can be towed to the location where shredding is to take place.

Power is applied to drive shaft 134 and centrifugal fan 80 and rotors 96 brought up to speed. Moving means 34 is then used to slowly advance the bale longitudinally into the shredder. As the end of the bale enters outlet ;6, rotor blades 122 are wiped across the end of the bale tearing it apart and throwing loosened material outwardly in the direction of encircling blades 116. Fan knives 120 cooperate with blades 116 in a scissoring action to shred the material torn loose by rotor knives 122. Scissored material passes between blades 122 into fan housing 106 where it is blown out of discharge opening 108 by vanes 92.

As the load on centrifugal fan 80 changes, electronic feedback mechanism 158 increases or decreases the speed with which moving means 34 advances the bale into outlet 16. If the bale contains a tramp material which cannot be shredded, electronic feedback mechanism can be used to reverse the direction of travel on moving means 34 to remove bale 18 from receptacle 12.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A bale shredder comprising a bale receptacle with an inlet and an outlet, means for advancing a bale towards the outlet, a centrifugal fan with a closed bale-side end positioned substantially transverse the outlet of the bale receptacle, said fan enclosed in a fan housing with a discharge opening and an aperture exposing said closed bale-side end of the fan, said outlet of the bale receptacle abutted with the aperture in the fan housing, said bale-side end of the fan set back in said aperture and having a plurality of vanes about its periphery, one or more rotors mounted on said bale-side end of the fan, each rotor having an axis of rotation substantially parallel to and offset from the axis of rotation of the fan, one or more knives mounted on each rotor and projecting into the outlet for engaging and tearing apart the bale disposed within the outlet, and means for rotating the fan and each rotor about said substantially parallel and spaced apart axes whereby each rotating knife on each rotor is wiped across the bale in the outlet by the compound motion of the rotating fan and rotor and tears it apart while the vanes on the fan blow the torn apart bale out the discharge opening of the fan housing.

2. The bale shredder of claim 1 wherein there are a plurality of rotors and wherein the rotors turn int he same direction as the fan, orbit within the periphery of the fan and do not overlap each other.

3. The bale shredder of claim 2 wherein the receptacle has a bottom which is semicircular in cross-section and has a closed top over the outlet.

4. The bale shredder of claim 3 wherein the means for advancing a bale comprises a plurality of endless chains with spaced apart teeth which form a conveyor centered about a longitudinal axis passing along the bottom of the receptacle.

5. The bale shredder of claim 3 wherein the means for advancing a bale comprises a plurality of augurs which form a conveyor centered about a longitudinal axis passing along the bottom of the receptacle.

6. A bale shredder comprising a bale receptacle with an inlet and an outlet, means for advancing a bale towards the outlet, a centrifugal fan with a bale-side end positioned substantially transverse the outlet of the bale receptacle, said fan enclosed in a fan housing with a discharge opening and an aperture exposing said bale-side end of the fan, said outlet of the bale receptacle abutted with the aperture in the fan housing, said fan housing having a plurality of blades mounted around the aperture projecting into the fan housing substantially parallel to the axis of rotation of the fan, one or more rotors mounted on said bale-side end of the fan, each rotor orbiting within the periphery of the centrifugal fan and having an axis of rotation substantially parallel to and offset from the axis of rotation of the fan, a plurality of knives mounted o each rotor and projecting into the outlet for engaging and tearing apart the bale disposed within the outlet of the receptacle, a plurality of knives mounted about the periphery of the bale-side end of the fan, said blades loosely collaring the knives on the fan when the fan is rotated and means for rotating the fan and each rotor about said substantially parallel and spaced apart axes whereby the rotating knives on each rotor are wiped across the bale in the outlet by the compound motion of the rotating fan and rotor to tear it apart and the knives on the fan cooperate with blades about the periphery of the aperture in a scissoring action to shred the material torn loose by the rotor.

7. A bale shredder of claim 6 wherein the axis of rotation of the fan is about a fan shaft, wherein the axis of rotation of each rotor is about a rotor shaft and wherein the means for rotating the fan and each rotor comprises a drive shaft connected to a power source and a driven shaft connected to the fan shaft, a first drive pulley on the drive shaft is connected to a larger driven pulley on the driven shaft whereby the driven shaft is rotated at a slower speed than the drive shaft, an idler pulley is mounted on the driven shaft and connected to a rotor pulley on each fan shaft, a second drive pulley on the drive shaft larger than the idler pulley is connected to the idler pulley whereby each rotor shaft is rotated at a faster speed than the drive shaft.

8. The bale shredder of claim 7 wherein a feedback mechanism senses the load on the centrifugal fan and controls the means for advancing a bale towards the outlet whereby the means for advancing a bale are coordinated with the speed at which the centrifugal fan is rotated.

9. A bale shredder comprising a bale receptacle with a bottom which is generally circular in cross-section and an inlet and an outlet, means for advancing a bale towards the outlet, a centrifugal fan with a closed bale-side end and a closed outside end, said bale-side end positioned substantially transverse the outlet of the bale receptacle, said fan enclosed in a fan housing and having a plurality of vanes, said vanes being closely adjacent to the fan housing when the fan is rotated, said fan housing having a discharge opening and a bale-side aperture exposing the bale-side end of the fan and an outside aperture exposing the outside end of the fan, said outlet of the bale receptacle abutted with the bale-side aperture in the fan housing, said fan housing having a plurality of blades mounted around the bale-side aperture projecting into the fan housing substantially parallel to the axis of rotation of the fan, one or more rotors mounted on said bale-side end of the fan, each rotor orbiting within the periphery of the centrifugal fan and having an axis of rotation substantially parallel to and offset from the axis of rotation of the fan, a plurality of knives mounted on each rotor and projecting into the outlet for engaging and tearing apart the bale disposed within the outlet of the receptacle, a plurality of knives mounted about the periphery of the bale-side end of the fan, said blades loosely collaring the knives on the bale-side end of the fan when the fan is rotated and means for rotating the fan and each rotor about said substantially parallel and spaced apart axes whereby the rotating knives on each rotor are wiped across the bale in the outlet by the compound motion of the rotating fan and rotor to tear it apart and the knives on the fan cooperate with blades about the periphery of the bale-side aperture in a scissoring action to shred the material torn loose by the rotor while the vanes on the fan blow the shredded material out the discharge opening.

10. The bale shredder of claim 9 wherein a plurality of radial bars are attached to the outside end of the fan whereby as the centrifugal fan is rotated the radial bars set up a back pressure in the fan housing which prevents significant amounts of shredded material from being blown out through the outside aperture.

11. The bale shredder of claim 10 wherein the axis of rotation of the fan is about a fan shaft, wherein the axis of rotation of each rotor is about a rotor shaft and wherein the means for rotating the fan and each rotor comprises a drive shaft connected to a power source and a driven shaft connected to the fan shaft, a first drive pulley on the drive shaft is connected to a larger driven pulley on the driven shaft whereby the driven shaft is rotated at a slower speed than the drive shaft, an idler pulley is mounted on the driven shaft and connected to a rotor pulley on each fan shaft, a second drive pulley on the drive shaft larger than the idler pulley is connected to the idler pulley whereby each rotor shaft is rotated at a faster speed than the drive shaft.

12. The bale shredder of claim 11 wherein a feedback mechanism senses the load on the centrifugal fan and controls the means for advancing a bale towards the outlet whereby the means for advancing a bale are coordinated with the speed at which the centrifugal fan is rotated.

13. The bale shredder of claim 12 wherein there are a plurality of rotors which rotate in the same direction as the fan and do not overlap each other and wherein the rotors are recessed in the bale-side of the fan and have a plurality of radial bars on the recess side of the rotors for blowing chopped material out of the recess.

14. The bale shredder of claim 13 wherein the receptacle has a bottom which is semicircular in cross-section and has a closed top over the outlet.

15. The bale shredder of claim 14 wherein the means for advancing a bale comprises a conveyor centered about a longitudinal axis passing along the bottom of the receptacle.

16. The bale shredder of claim 15 wherein the conveyor is formed from a plurality of endless chains which pass through slots in the receptacle adjacent the inlet and outlet and which are wrapped on drive sprockets at one end and on idler sprockets at the other end, said drive sprockets connected to a power source through the feedback mechanism.

17. The bale shredder of claim 16 wherein the idler sprockets are mounted on shafts which can be moved forward and rearward to adjust the tension on the chains.

18. The bale shredder of claim 17 wherein the chains have spaced apart teeth angled towards the inlet of the receptacle and a correspondingly sloped flange at a forward end of each slot adjacent the outlet to wipe the teeth as they exit the receptacle so that little material in the receptacle is pulled through the slots by the chains.

* * * * *